(12) United States Patent
Ookoshi et al.

(10) Patent No.: US 6,366,055 B1
(45) Date of Patent: Apr. 2, 2002

(54) POWER SUPPLY SYSTEM AND STATE OF CHARGE ESTIMATING METHOD

(75) Inventors: Tetsuro Ookoshi; Satoshi Minoura, both of Fukaya; Tokiyoshi Hirasawa, Higi-gun; Yoshinari Morimoto, Fukaya; Ichiro Shimoura, Ueno; Yoshihisa Okuda, Osato-gun; Kenichi Maeda, Saitama; Keizo Yamada, Osato-gun, all of (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/816,145

(22) Filed: Mar. 26, 2001

(30) Foreign Application Priority Data

| | | |
|---|---|---|
| Mar. 30, 2000 | (JP) | 12-093726 |
| Apr. 28, 2000 | (JP) | 12-128741 |
| Apr. 28, 2000 | (JP) | 12-128742 |
| Apr. 28, 2000 | (JP) | 12-128743 |
| Jul. 11, 2000 | (JP) | 12-209284 |
| Jul. 28, 2000 | (JP) | 12-228688 |
| Jul. 31, 2000 | (JP) | 12-231620 |
| Jul. 31, 2000 | (JP) | 12-231621 |

(51) Int. Cl.[7] .............................. H02J 7/14; H02J 7/00
(52) U.S. Cl. ..................... 320/134; 320/132; 320/106
(58) Field of Search ............................ 320/103, 126, 320/134, 132, 106; 429/61; 307/150, 48

(56) References Cited

U.S. PATENT DOCUMENTS 5,568,038 A * 10/1996 Tatsumi ...................... 320/103

* cited by examiner

Primary Examiner—Gregory Toatley
(74) Attorney, Agent, or Firm—Oliff & Berridge, PLC

(57) ABSTRACT

A power system where energy generated at a deceleration time of a running vehicle such as an automobile can be accepted as regenerative energy sufficiently and safely is provided. In a power system 10, a non-aqueous solution system secondary battery group 1 where 10 to 11 lithium ion secondary battery cells are connected in series and an aqueous solution system secondary battery group 2 where 18 control valve type lead-acid battery cells are connected in series are connected in parallel. The battery capacity of the non-aqueous solution system secondary battery group 1 is smaller than that of the aqueous solution system secondary battery group 2. The non-aqueous solution system secondary battery group 1 and the aqueous solution system secondary battery group 2 are charged at a current value of 7C or less from a motor generator 3, and the ratio of the charged current value of the aqueous solution system secondary battery group 2 to the charged current value of the non-aqueous solution system secondary battery group 1 is 0.05 to 1.00.

22 Claims, 7 Drawing Sheets

PRIOR ART

POWER SUPPLY SYSTEM AND STATE OF CHARGE ESTIMATING METHOD

This application is based upon a Japanese patent application, serial number 2000-093726, entitled "Power system For Running Vehicle", of Ookoshi et al., filed on Mar. 30, 2000, Japanese patent applications, serial numbers 2000-128741, 2000-128742 and 2000-128743 entitled "Power system For Running Vehicle", of Shimoura, Ookoshi et al., filed on Apr. 28, 2000, a Japanese patent application, serial number 2000-209284, entitled "Power system For Running Vehicle", of Okuda et al., filed on Jul. 11, 2000, a Japanese patent application, serial number 2000-228688, entitled "Power system For Running Vehicle and State of Charge Estimating Method for the System", of Ookoshi et al., filed on Jul. 28, 2000, a Japanese patent application, serial number 2000-231620, entitled "Power system For Running Vehicle", of Okuda et al., filed on Jul. 31, 2000, and a Japanese patent application, serial number 2000-231621, entitled "Secondary battery For Running Vehicle", of Maeda et al., filed on Jul. 31, 2000.

FIELD OF THE INVENTION

The present application relates to a 42V power system and a state of charge estimating method, and in particular relates to a 42V power system which is mounted on a vehicle and which can receive power supplied from a generator, and a state of charge estimating method for estimating a state of charge of the 42V power system.

DESCRIPTION OF THE RELATED ART

Conventionally, a power system where a 12V system lead-acid battery is housed (hereinafter, referred to as 14V system) has been used in an automobile. In the 14V system, current is supplied (discharged) from the 12V system lead-acid battery to a vehicle starting device (starter motor), and after an engine starts, current is always supplied (charged) to the 12V system lead-acid battery from the generator operated by rotating force of the engine. However, the energy at a time of deceleration of the automobile is consumed as heat.

In recent years, instead of the 12V system lead-acid battery, a new type power system where a 36V system lead-acid battery is mounted (hereinafter, referred to as 42V system) has been proposed. In the 42V system, it has been made possible to use a high power motor generator as a vehicle starting device for starting the engine of the vehicle. For this reason, the energy which had conventionally been consumed as heat at the time of deceleration of the automobile is converted to electric energy by the motor generator to be supplied (charged) to the 36V system lead-acid battery as regenerative energy. According to the new power system, energy efficiency is increased so that fuel consumption in the automobile can be improved.

As shown in FIG. 13, in the 36V system lead-acid battery, a mono-block container having 12 cell chambers partitioned in a matrix of 2 rows and 9 columns is used. Unit cells of 2V lead-acid battery are accommodated in the respective cell chambers. The respective unit cells are connected serially by inter-cell connecting members 19 for connecting adjacent cell chambers in the order of the first row and the first column, the first row and the second column, the first row and the third column, the first row and the fourth column, the first row and the fifth column, the first row and the sixth column, the first row and the seventh column, the first row and the eighth column, the first row and the ninth column, the second row and the ninth column, the second row and the eighth column, the second row and the seventh column, the second row and the sixth column, the second row and the fifth column, the second row and the fourth column, the second row and the third column, the second row and the second column, and the second row and the first column. Also, the 36V system lead-acid battery is provided at the cell chambers which are respectively defined by the first row and the first column and the second row and the first column with external output terminals (positive external terminal 16 and negative external terminal 17).

However, the motor generator used for the 42V system generates a high power of 3 to 4 kW, and the current value at a regeneration time thereof reaches 40 to 80 A (corresponding to 2 to 4 CA). In the lead-acid battery, when the charged rate reaches a current value of 1 CA or more, a decomposition reaction of water which is a sub-reaction at a time of charging is accelerated so that the charging efficiency is reduced, thereby affecting the life of the battery adversely. Therefore, it is difficult to allow such large current charging in a conventional lead-acid battery.

In order to solve this problem, there has been a proposal where control is performed so as to achieve a constant voltage charge within a range where the sub-reaction does not occur. However, the charge reaches the constant voltage region rapidly, loss of the regenerative energy increases. Also, in a case that a large current charging is allowed, there occurs a drawback in that the temperature of the lead-acid battery ascends and the life of the storage battery may be decreased in an assumption that the battery is mounted in the engine room (atmospheric temperature of 60° C.) of an automobile.

It is desirable that the state of charge of the lead-acid battery is controlled within a range of 60% to 80%. In order to control the state of charge of the battery, a method for measuring an open circuit voltage is mainly employed conventionally. However, such an error factor that a long time is required until the open circuit voltage of the lead-acid battery is made stable is large, so that a sufficient control accuracy of the state of charge in the lead-acid battery could not have been achieved.

Further, in the structure of the lead-acid battery shown in FIG. 13, the external terminals are provided at the cell chambers of the first row and the first column and the second row and the first column. Therefore, there is a problem in that, since the distance between the external terminals are made close to each other to be shortened, leakage current becomes easy to flow between the 36V terminals. Further, when the 36V lead-acid battery is connected in the power system (42V system), erroneous connection may occur between a plus cable and a minus cable.

SUMMARY OF THE INVENTION

In view of the above circumstances, a first object of the present invention is to provide a power system where energy generated at a time of deceleration of a running vehicle such as an automobile can be received as regenerative energy sufficiently and safely.

Also, a second object of the present invention is to provide a state of charge estimating method where a control accuracy of the state of charge in a power system is high.

In order to achieve the above objects, according to the present invention, there is provided a 42V power system which is mounted on a vehicle and which can receive electrical power supplied from a generator, comprising: an aqueous solution system secondary battery group where a plurality of aqueous solution system cells are connected; and a non-aqueous solution system secondary battery group which is connected to the aqueous solution system secondary battery group in parallel, which has a group battery capacity smaller than that of the aqueous solution system secondary battery group, and where a plurality of non-aqueous solution system cells are connected.

In the present invention, the aqueous solution system secondary battery group where its battery capacity is large but its capacity receiving regenerated power from a generator is small and the non-aqueous solution system secondary battery group where its battery capacity is small but its capacity receiving regenerated power from a generator is large are connected to each other in parallel. At a braking time of a vehicle, power of a large current regenerated from the generator is charged into the non-aqueous solution system secondary battery group and the aqueous solution system secondary battery group. Since the regenerated power receiving capacity of the non-aqueous solution system secondary battery group is larger than that of the aqueous solution system secondary battery group, more power (electric energy) is accepted in the non-aqueous solution system secondary battery group. Since the braking time of the vehicle is short, the battery capacity of the non-aqueous system secondary battery group can be made smaller than that of the aqueous solution system secondary battery group. Since the non-aqueous solution system secondary battery group and the aqueous solution system secondary battery group are connected to each other in parallel, the power which has been once accepted in the non-aqueous solution system is supplied to the aqueous solution system secondary battery group.

According to the present invention, since the regenerated energy at the braking time of the vehicle can be accepted (charged) efficiently by combining the non-aqueous solution system secondary battery group and the aqueous solution system secondary battery system to each other, a power system with a high energy efficiency can be realized.

In this case, when the charging voltage of the non-aqueous solution system secondary battery group is set to 4.2V/cell or less, the temperature raising can be suppressed at a charging time of the non-aqueous unit cells, so that the safety of the power system can be secured. Also, there is provided a state of charge estimating method which estimates a state of charge of a power system which comprising a flow divider diving current so as to maintain the states of charge of the aqueous solution system secondary battery group and the non-aqueous solution system secondary battery group in the same level and where a charging/discharging circuit of the aqueous solution system secondary battery group and a charging/discharging circuit of the non-aqueous solution system secondary battery are connected to each other through the flow divider, wherein the state of charge of the aqueous solution system secondary battery group is estimated by detecting the state of charge of the non-aqueous solution system secondary battery group, the state of charge of the aqueous solution system secondary battery group can be estimated with a high accuracy on the basis of the state of charge of the non-aqueous solution system secondary battery group. At this time, it is preferable that the power system is provided with a battery controller which controls the state of charge of the non-aqueous solution system secondary battery group.

The present invention will become more apparent by referring to preferable embodiments described below.

DETAILED DESCRIPTION OF THE PREFERRED EMBODIMENTS (First Embodiment)

A first embodiment of a power system according to the present invention will be explained below with reference to the drawings.

[Aqueous Solution System Secondary Battery]

As an aqueous solution system secondary battery used in the present embodiment, a so-called lead-acid battery, especially a control valve type lead-acid secondary battery can be exemplified. This battery is prepared in the following manner. Lead dioxide is used as material for a positive electrode, and spongy lead is used as material for a negative electrode. The positive electrode, the negative electrode and a glass fiber separator are used to manufacture a group of laminated electrodes and insert the same in a rectangular container. A lid with an opening for a control valve mounting portion is attached to the container, dilute sulfuric acid which is electrolyte is poured in the container, and the battery is sealed by fitting a control valve to the opening.

[Non-Aqueous Solution System Secondary Battery]

As a non-aqueous solution system secondary battery used in the present embodiment, a so-called lithium secondary battery, especially a lithium ion secondary battery can be exemplified. This battery is prepared in the following manner. Manganese oxide containing lithium is used as active material for a positive electrode, and carbon powder which is active material is used for a negative electrode. The positive electrode, the negative electrode and a separator are used to manufacture a wound type electrode body and insert the same into a cylindrical battery can. Electrolyte is poured in the battery can and the battery can is sealed by a sealing body which also serves as a positive electrode terminal.

[Configuration of Power System 10]

Figure 1:
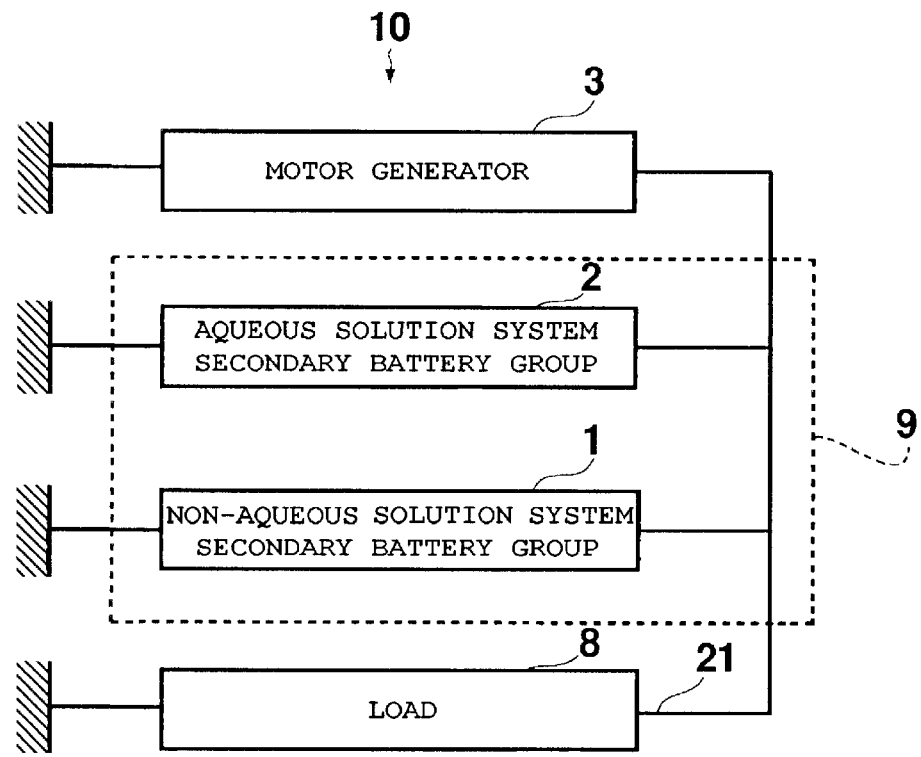
FIG. 1 is a block diagram of a power system of a first embodiment to which the present invention is applicable.

As shown in FIG. 1, in a power system 10 according to the present embodiment, a non-aqueous solution system secondary battery group 1 and an aqueous solution system secondary battery group 2 are connected in parallel to each other. The non-aqueous solution system secondary battery group 1 and the aqueous solution system secondary battery group 2 include a plurality of non-aqueous solution system secondary batteries connected in series and a plurality of aqueous solution system secondary batteries connected in series, respectively. Also, the non-aqueous solution system secondary battery group 1 and the aqueous solution system secondary battery group 2 are connected to a load 8. Thereby, the non-aqueous solution system secondary battery group 1 and the aqueous solution system secondary battery group 2 have a discharging path reaching to a vehicle starter. Further, the non-aqueous solution system secondary battery group 1 and the aqueous solution system secondary battery group 2 are connected to a motor generator 3 in parallel when the motor generator 3 serves as a generator to supply regenerative energy (electrical power). The generation voltage of the motor generator 3 is 42V and a 42V system is configured as the whole of the power system 10.

A 36V system control valve system lead-acid battery (36V–18 Ah) comprising 18 cells is used as the aqueous solution system secondary battery group 2. Also, 10 or 11 lithium ion secondary battery cells (3.6V–3.5 Ah per cell) connected in series are used as the non-aqueous solution system secondary battery group 1. The group battery voltage (hereinafter, referred to as "battery voltage") of the non-aqueous solution system secondary battery group 1 is 36V or 36.9V. Incidentally, the group battery capacity (hereinafter, simply called "battery capacity") of the non-aqueous solution system secondary battery group 1 is set to 3.5 Ah which is smaller than that of the aqueous solution system secondary battery group 2 which is 18 Ah.

[Mono-Block Container]

Figure 2:
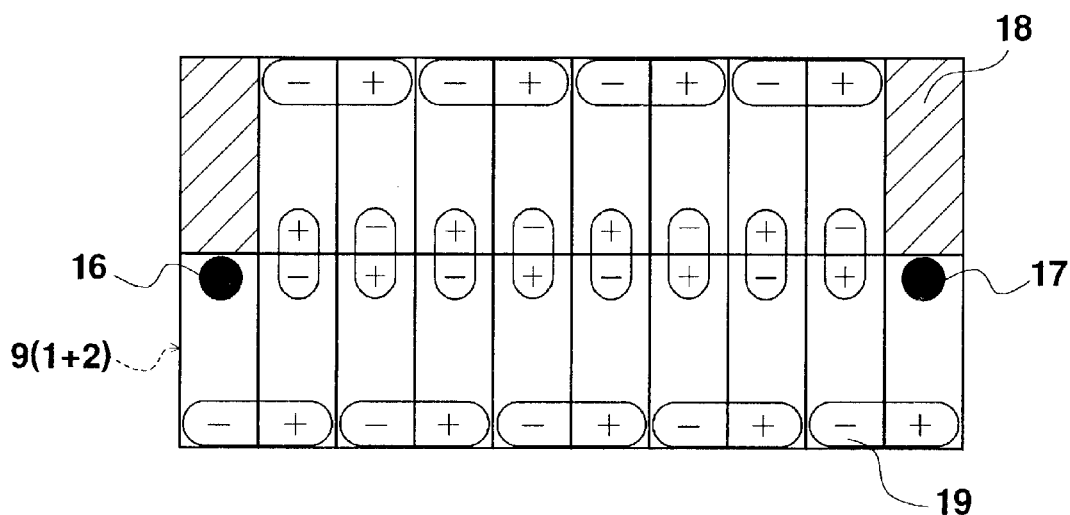
FIG. 2 is a plan view schematically showing a position of a cell array of an aqueous solution system secondary battery group and a space for a non-aqueous solution system secondary battery group according to the first embodiment.

As shown in FIGS. 1 and 2, the non-aqueous solution system secondary battery group 1 and the aqueous solution system secondary battery group 2 are accommodated in a mono-block container 9 having the total 20 cell chambers partitioned to an array of 2 rows and 10 columns. As shown in FIG. 2, the cell chamber defined at the first row and the first column and/or at the first row and the tenth column serves as a space 18 for a non-aqueous solution system secondary battery group which accommodates the non-aqueous solution system secondary battery group 1 where the non-aqueous solution system secondary battery cells are connected in series by the number of 10 to 11 cells. Also, the total 18 cell chambers of the cell chambers defined at the first row and the second to ninth columns and the cell chambers defined at the second row and all the columns serve as spaces each accommodating one aqueous solution system secondary battery cell. The 18 cells are connected in series in the order of the second row and the first column, the second row and the second column, the first row and the second column, the first row and the third column, the second row and the third column, the second row and the fourth column, the first row and the fourth column, the first row and the fifth column, the second row and the fifth column, the second row and the sixth column, the first row and the sixth column, the first row and the seventh column, the second row and the seventh column, the second row and the eighth column, the first row and the eighth column, the first row and the ninth column, the second row and the ninth column, and the second row and the tenth column by inter-cell connecting members 19, so that the aqueous solution system secondary battery group 2 is configured. The aqueous solution system secondary battery group 2 and the non-aqueous solution system secondary battery group 1 are connected in parallel in the mono-block container 9. Further, external terminals for the aqueous solution system secondary battery group 2 which also serves at external output terminals (a positive electrode external terminal 16 and a negative electrode external terminal 17) are disposed in the cell chambers defined at the second row and the first column and at the second row and the tenth column. Incidentally, the positive electrode and the negative electrode of the non-aqueous solution system secondary battery group 1 are respectively connected to the positive electrode external terminal 16 and the negative electrode external terminal 17 within the interior of the mono-block container 9.

[Operation of Power System 10]

At a time of staring a vehicle, the motor generator 3 is actuated by output from the aqueous solution system secondary battery group 2. On the other hand, regenerative energy generated by the motor generator 3 at a time of braking is partially accepted (charged) to the aqueous solution system secondary battery group 2 as electric energy. In the power system 10, the regenerative energy is accepted at a current value whose charging rate is 7 C or less in the non-aqueous solution system secondary battery group 1 and the aqueous solution system secondary battery group 2 connected in parallel. Assuming that a value of current flowing through the aqueous solution system secondary battery group 2 is X and a value of current flowing through the non-aqueous solution system secondary battery group 1 is Y, ratio (X/Y) is 0.05 or more and 1.00 or less. According to the power system 10, since more regenerative energy is accepted in the non-aqueous solution system secondary battery group 1 has a regenerative energy receiving capability more than that of the aqueous solution system secondary battery group 2, energy efficiency can be improved.

Also, in the present embodiment, a charging voltage to each non-aqueous solution system secondary battery cell is restricted to 4.2V/cell or less when the non-aqueous solution system secondary battery group is charged from the motor generator 3. Accordingly, it is made possible to suppress temperature raising at a time of charging the non-aqueous solution system secondary battery group 1.

Further, in this embodiment, since the mono-block container 9 having the total 20 cell chambers partitioned to two rows and ten columns is used, the external terminals of the aqueous solution system secondary battery group 2 which serve as the external output terminals (the positive electrode external terminal 16 and the negative electrode external terminal 17) of the two secondary battery groups can be provided to the cell chambers defined at the second row and the first column and at the second row and the tenth column. Furthermore, the external output terminals can be disposed so as to be positioned nearer to the cell chambers defined at the first row and the first column at the first row and the tenth column. Accordingly, the external output terminals are respectively positioned almost at a center of the first column and almost at a center of the tenth column so that the distance between the positive electrode external terminal 16 and the negative electrode external terminal 17 becomes longer. For this reason, leakage current flow becomes difficult to occur and erroneous connection between a plus cable and a minus cable becomes difficult to occur when connection of the secondary battery for a running vehicle is performed in the power system 10.

Incidentally, in the present invention, a case that the non-aqueous solution system secondary battery group 1 is accommodated in the spaces 18 for a non-aqueous solution system secondary battery group of the cell chambers defined at the first row and the first column and at the first row and the tenth column has been shown. However, such a structure can be employed in this embodiment that one of the cell chambers defined at the first row and the first column and at the first row and the tenth column is used as the space for a non-aqueous solution system secondary battery group and another may be used as a space for a controller which accommodates a battery controller for controlling the state of charge of the non-aqueous solution system secondary battery group, for example.

Also, in the present embodiment, a case that the monoblock container 9 is employed has been shown, but the present invention can improve a regenerative current receiving capability even when the mono-block container 9 is not used. For example, the aqueous solution system secondary battery group may be structured by three 12V system lead-acid batteries. Also, the non-aqueous solution system secondary battery group 1 may be configured by connecting a plurality of assembled batteries in series, each being configured by 3 to 4 lithium ion secondary batteries.

Further, in this embodiment, a case that the battery capacities of the non-aqueous solution system secondary battery group 1 and the aqueous solution system secondary battery group 2 are respectively 3.5 Ah and 18 Ah has been shown, but the present invention is not limited to this case. The present invention is applicable to any case that the battery capacity of the non-aqueous solution system secondary battery group 1 is smaller than that of the aqueous solution system secondary battery group 2.

(Second Embodiment)

Next, a second embodiment of a power system according to the present invention will be explained. A power system of this embodiment is provided with a flow divider which divides current so as to maintain the state of charge, hereinafter referred to as "SOC") of the aqueous solution system secondary battery group and the state of charge of the non-aqueous solution system secondary battery group in the same level and battery controllers which control the aqueous solution system secondary battery group and the non-aqueous solution system secondary battery group separately or independently. Incidentally, in this embodiment, the same members and/or portions as those in the first embodiment are attached with the same reference numerals, explanation thereof will be omitted, and only different members or portions will be explained.

[Configuration of Power System 20]

Figure 3:
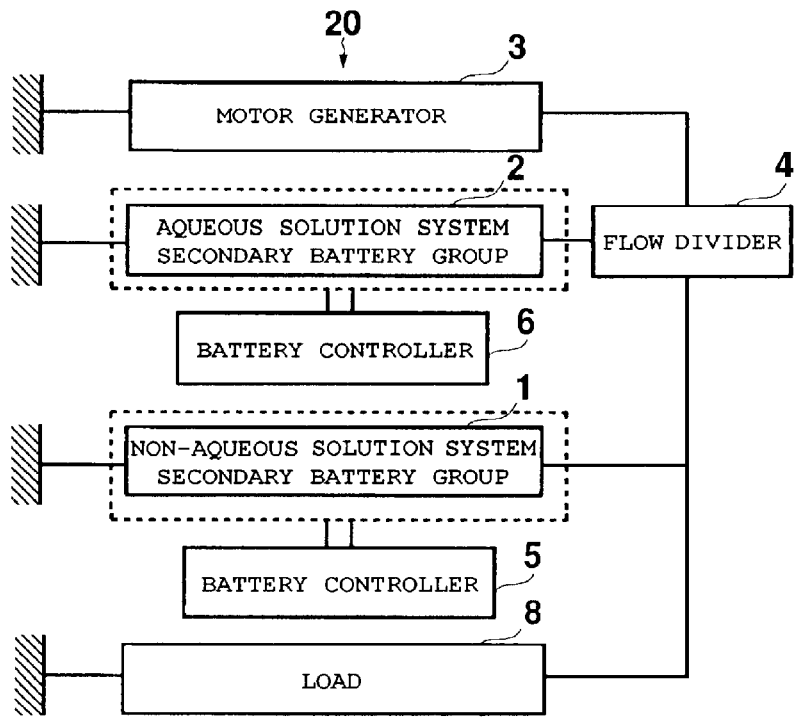
FIG. 3 is a block diagram of a power system of a second embodiment to which the present invention is applicable.

As shown in FIG. 3, in a power system 20 of the present embodiment, a non-aqueous solution system secondary battery group 1 equipped with a battery controller 5 and an aqueous solution system secondary battery group 2 equipped with a battery controller 6 are connected in parallel through a flow divider 4. The flow divider 4 distributes current flowing at a time of charging/discharging of the power system 20 to the aqueous solution system secondary battery group 2 and the non-aqueous solution system secondary battery group 1 at a battery capacity ratio (for example, 18 Ah/3.5 Ah).

The non-aqueous solution system secondary battery group 1 is structured by connecting 10 lithium ion secondary battery cells (3.6V–3.5 Ah per cell) in series and the battery voltage thereof is 36V. The SOC of the non-aqueous solutions system secondary battery group 1 is always controlled by the controller 5. Also, the aqueous solution system secondary battery group 2 is structured by a 36V system control valve type lead-acid battery (36V–18 Ah) comprising 18 cells, and the SOC thereof is always controlled the controller 6. The battery capacity of the non-aqueous solution system secondary battery group 1 is 3.5 Ah (5 hour rate discharge capacity) and that of the aqueous solution system secondary battery group 2 is 18 Ah (5 hour rate discharge capacity).

[Operation of Power System 20]

At a time of staring a vehicle, the motor generator 3 is actuated by output from the aqueous solution system secondary battery group 2. On the other hand, regenerative energy occurring at a time of braking is partially regenerated (charged) to the aqueous solution system secondary battery group 2 as electric energy, and is also regenerated (charged) to the non-aqueous solution system battery group 1 which has a regenerative current receiving capability larger than that of the aqueous solution system secondary battery group 2. Accordingly, current charged to the non-aqueous solution system secondary battery group 1 is larger than current charged to the aqueous solution system secondary battery group 2, so that the energy efficiency of the power system 20 can be improved.

Figure 4:
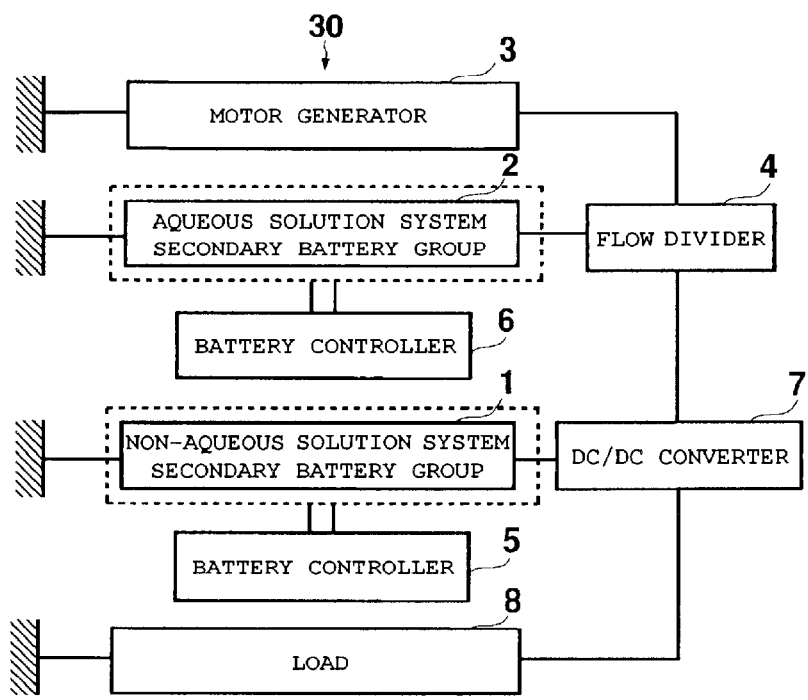
FIG. 4 is a block diagram of a modified embodiment of the power system of the second embodiment.

Incidentally, in this embodiment, a case that the lithium ion secondary battery cells (3.6V–3.5 Ah) connected in series are use as the non-aqueous solution system secondary battery group 1 in order to cause the battery voltage of the non-aqueous solution system secondary battery group 1 and that of the aqueous solutions system secondary battery group 2 to approximately coincide with each other has been shown. As shown in FIG. 4, however, such a structure may be employed that one lithium ion secondary battery (3.6V–3.5 Ah) or two to nine lithium ion secondary batteries connected in series are used as the non-aqueous solutions system secondary battery group 1 and the battery voltage of the non-aqueous solution system secondary battery group 1 is caused to coincide with that of the aqueous solution system secondary battery group 2 by a DC/DC converter 7. In this case, the battery voltage of the non-aqueous solution system secondary battery group 1 is 3.6×nV (n is the number of lithium ion secondary batteries). In such a modified embodiment, since the number of non-aqueous solution system secondary batteries can be reduced, this embodiment is advantageous in the cost for manufacturing the power system.

Further, in this embodiment, the power system provided with the battery controllers 5 and 6 independently has been exemplified, but the present invention may be structured so as to use one battery controller having both functions of the battery controllers 5 and 6.

(Third Embodiment)

Next, a third embodiment of a power system according to the present invention will be explained. The power system of the present embodiment is configured so as to perform control by detecting the battery voltage of the SOC of the non-aqueous solution system secondary battery group 1. Incidentally, in this embodiment, the same members and/or portions as those in the second embodiment are attached with the same reference numerals, explanation thereof will be omitted, and only different members or portions will be explained.

Figure 5:
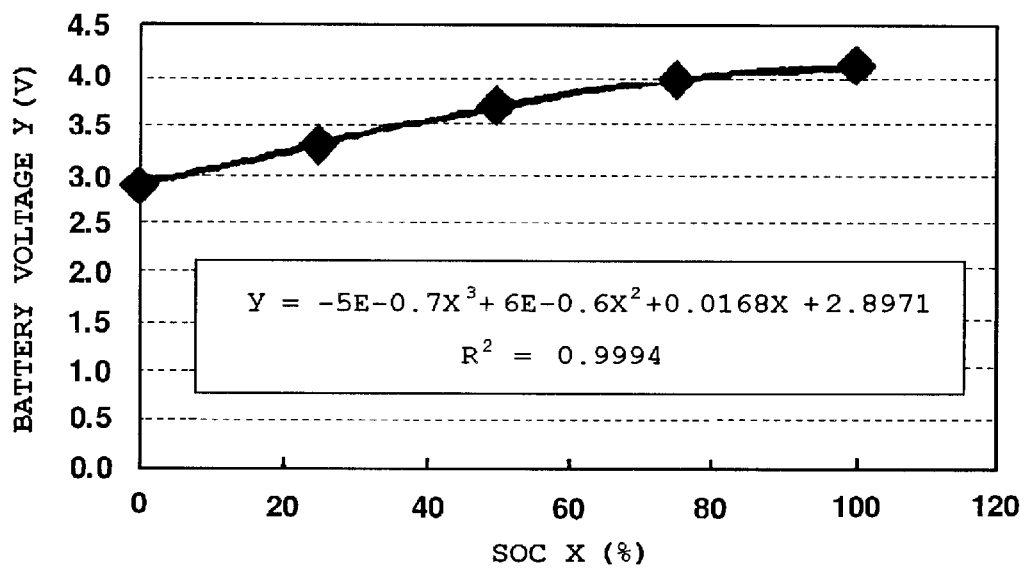
FIG. 5 is a graph showing a relationship between a state of charge and a battery voltage of a lithium ion secondary battery.

FIG. 5 shows a relationship between SOC (X) and battery voltage (Y) of a lithium ion secondary battery. There is a relationship expressed by the following cubic expression (1) between SOC (X) and battery voltage (Y) of a lithium ion secondary battery. A correlation coefficient $R^2$ between the SOC (X) and the battery voltage (Y) is 0.9994, and the correlation between the both is high.

$$Y=-5E-0.7X^3+6E-0.6X^2+0.0168X+2.8971 \quad (1)$$

[Structure of Power System 40]

Figure 6:
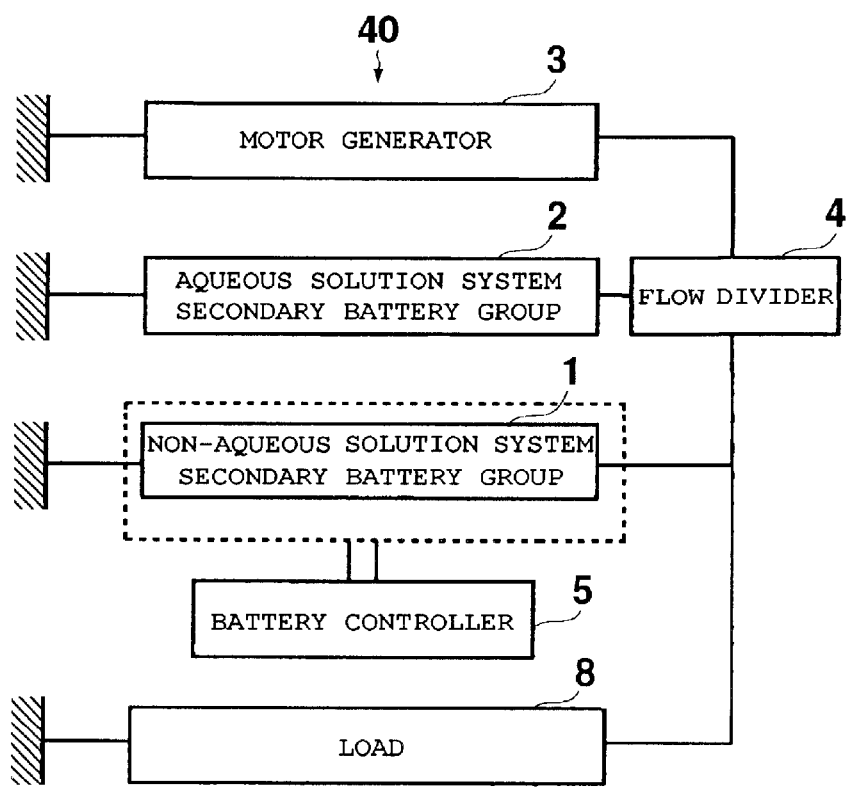
FIG. 6 is a block diagram of a power system of a third embodiment to which the present invention is applicable.

As shown in FIG. 6, in a power system 20 of the present embodiment, a non-aqueous solution system secondary battery group 1 equipped with a battery controller 5 and an aqueous solution system secondary battery group 2 are connected in parallel through a flow divider 4. The controller 5 in this embodiment detects the battery voltage of the non-aqueous solution system secondary battery group 1 to monitor/control the SOC of the non-aqueous solution system secondary battery group 1 according to the above equation (1). Incidentally, like the second embodiment, the non-aqueous solution system secondary battery group 1 is constituted by 10 lithium ion secondary batteries (3.6V–3.5 Ah) connected in series, and the battery voltage thereof is 36V. The SOC of the non-aqueous solution system secondary battery group 1 is always controlled by the battery controller 5. The aqueous solution system secondary battery group 2 includes a 36V system control valve type lead-acid battery (36V–18 Ah) comprising 18 cells.

[Operation of Power System 40]

At a time of staring a vehicle, the motor generator 3 is actuated by output from the aqueous solution system secondary battery group 2. On the other hand, regenerative energy occurring at a time of braking is partially regenerated (charged) to the aqueous solution system secondary battery group 2 as electric energy, and is also regenerated (charged) to the non-aqueous solution system battery group 1 which has a regenerative current receiving capability larger than that of the aqueous solution system secondary battery group 2, so that the energy efficiency as the power system for a running vehicle can be improved. Also, since the SOC of the non-aqueous solution system battery group 1 is controlled by the battery controller 5, when the non-aqueous solution system battery group 1 approaches to a full charge, the SOC is adjusted by supplying electric energy to the load 8.

Figure 7:
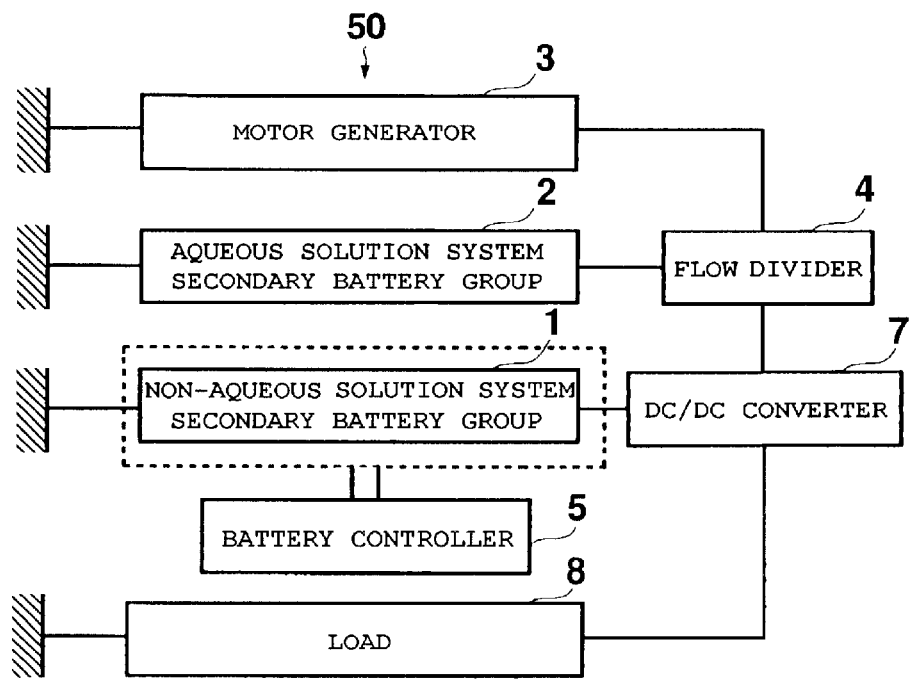
FIG. 7 is a block diagram of a modified embodiment of the power system of the third embodiment.
Figure 8:
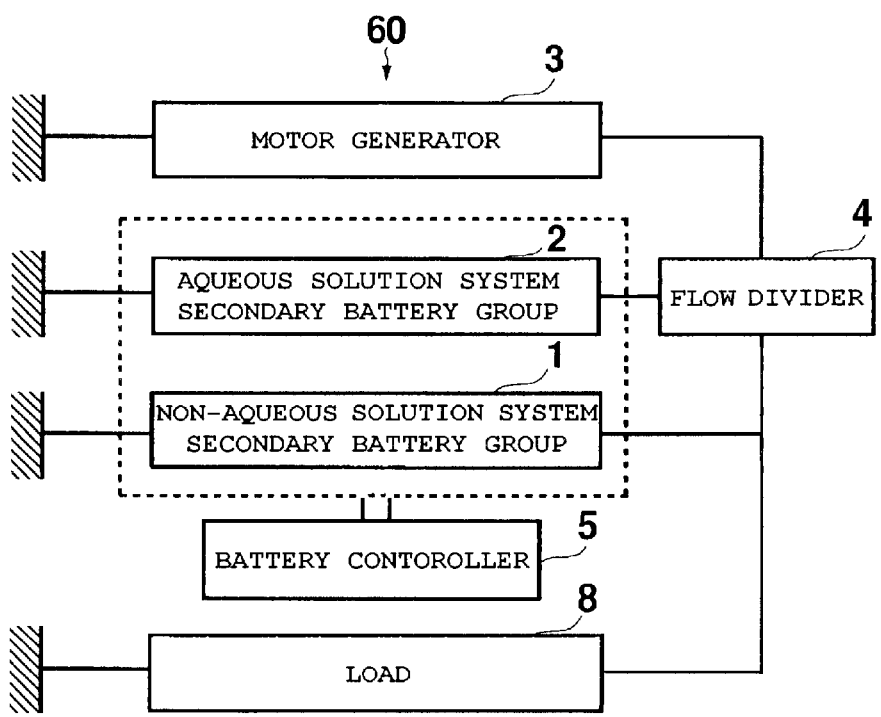
FIG. 8 is a block diagram of a power system of a fourth embodiment to which the present invention is applicable.

Incidentally, as shown in FIG. 7, even a power system 50 that the non-aqueous solution system secondary battery group 1 is constituted by one lithium ion secondary battery (3.6V–3.5 Ah) or two to nine lithium ion secondary batteries connected in series to achieve the battery voltage of 3.6×nV (n is the number of lithium ion secondary batteries) and a DC/DC converter 7 is provided can achieve the same effect as the present embodiment.

(Fourth Embodiment)

Next, a fourth embodiment of a power system according to the present invention will be explained. The power system of the present embodiment is configured so as to utilize a battery controller 5 controlling the SOC of the non-aqueous solution system secondary battery group 1 as an indicator for the SOC of the aqueous solution system secondary battery group 2. Incidentally, in this embodiment, the same members and/or portions as those in the third embodiment are attached with the same reference numerals, explanation thereof will be omitted, and only different members or portions will be explained.

[Structure of the Power System 60]

In a power system 60 of the present invention, like the power system 40 of the third embodiment, the non-aqueous solution system secondary battery group 1 is constituted by 10 lithium ion secondary batteries (3.6V–3.5 Ah) connected in series, and the battery voltage thereof is 36V. The SOC of the non-aqueous solution system secondary battery group 1 is always controlled by the battery controller 5. Also, the aqueous solution system secondary battery group 2 includes a 36V system control valve type lead-acid battery (36V–18 Ah) comprising 18 cells. The SOC of the aqueous solution system secondary battery group 2 is controlled by the battery controller 5 according to the relationship between the battery voltage and the SOC of the non-aqueous solution system secondary battery group 1 shown in FIG. 5 on the basis of the SOC of the non-aqueous solution system secondary battery group 1. Since the self discharge of the lithium ion secondary battery is small, it is possible to utilize this battery as an indicator for the SOC of the aqueous solution system secondary battery.

That is, since current flowing at a time of charging/discharging of the power system 60 is distributed by a flow divider 4 so that the SOCs of the aqueous solution system secondary battery group 2 and the non-aqueous solution system secondary battery group 1 are maintained in the same level, the SOC of the non-aqueous solution system secondary battery group 1 is detected by the controller 5 so that the SOC of the aqueous solution system secondary battery group 2 which is difficult to control can be estimated sufficiently.

Also, when respective initial SOCs of the aqueous solution system secondary battery group 2 and the non-aqueous solution system secondary battery group 1 are known, the SOC of the aqueous solution system secondary battery group 2 can be estimated even by detecting the change rate of the SOC of the non-aqueous solution system secondary battery group 1.

[Operation of Power System 60]

Like the above-mentioned power system 40, the power system 60 can not only receive regenerative energy sufficiently as a rechargeable power system for a running vehicle, but also can control the SOC of the aqueous solution system secondary battery group 2 while utilizing the lithium ion secondary battery as an indicator for the SOC of the 36V system control valve type lead-acid battery by means of the battery controller 5 for controlling the SOC of the non-aqueous solution system secondary battery group 1.

Figure 9:
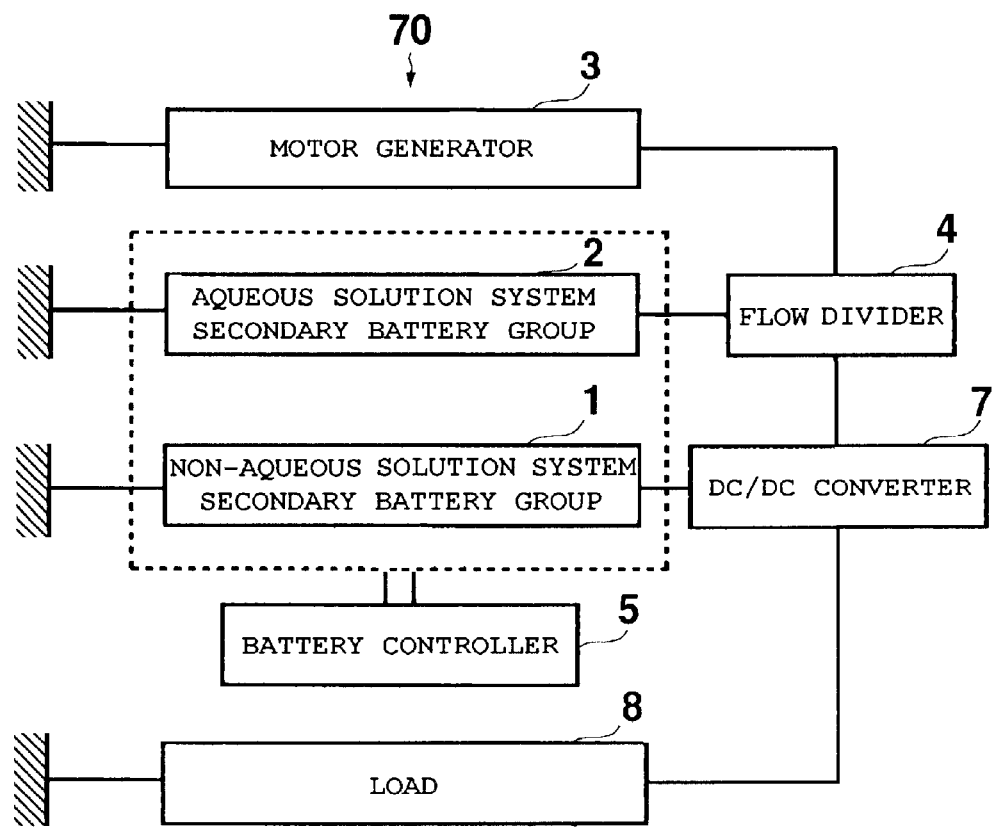
FIG. 9 is a block diagram of a modified embodiment of the power system of the fourth embodiment.

Incidentally, in the present embodiment, like a power system 70 shown in FIG. 9, even when such a structure is employed that one or two to nine lithium ion secondary batteries (3.6V–3.5 Ah) are used in series by a DC/DC converter 7, the same effects as those in the power system 60 can be obtained.

EXAMPLES

Next, the text results of charging tests of power systems of examples manufactured according to the above-mentioned embodiments will be explained. Incidentally, the test results of charging tests of power systems of comparative examples manufactured for comparison will also be explained.

<Examples 1 and 2 and Comparative Example 1>

In the power system 10, charging tests were performed regarding Example 1 where 10 lithium ion secondary batteries (3.6V–3.5 Ah) connected in series were used as the non-aqueous solution system secondary battery group 1 and Example 2 where 11 lithium ion secondary batteries (3.6V–3.5 Ah) connected in series were used as the non-aqueous solution system secondary battery group 1. A charging test was also performed regarding Comparative example 1 where only a 36V system control valve type lead-acid battery (36V–18 Ah) comprising 18 cells was used as a conventional power system.

Figure 10:
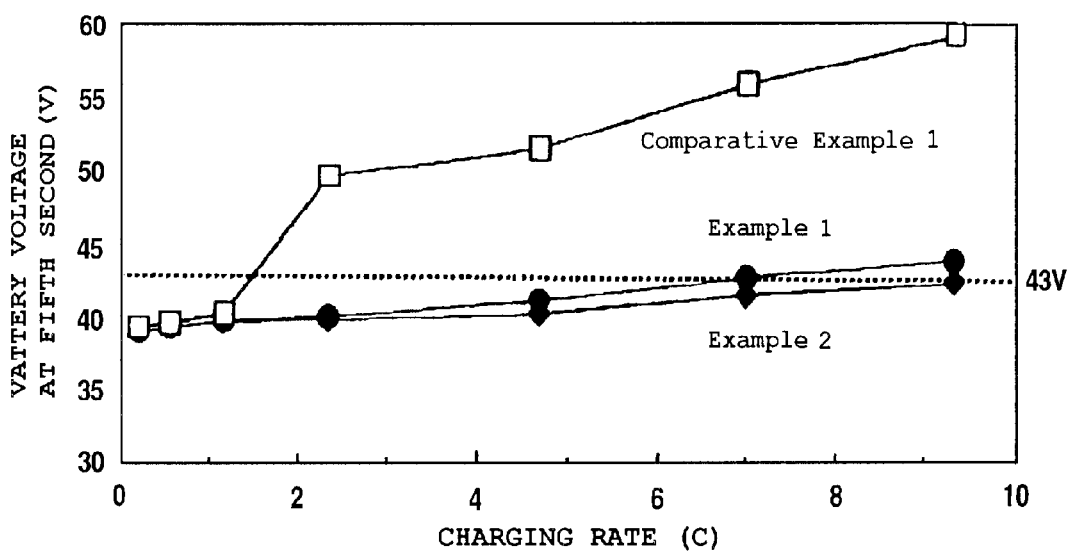
FIG. 10 is a graph showing a relationship between a battery voltage and a charging rate at a time of 5 seconds passed in power systems of Examples 1 and 2 and Comparative Example 1.

FIG. 10 shows a relationship between fifth second battery voltages and charging rates of Example 1, Example 2 and Comparative example 1. In Comparative example 1, when the charging rate exceeded 2 C, the fifth second battery voltage exceeded 43V and hydrogen generated in the 36V system control valve type lead-acid battery so that charging became impossible. To the contrary, in Example 1 and Example 2, since the regenerative receiving capabilities of the lithium ion secondary batteries (non-aqueous solution system secondary battery groups 1) were large, fifth second battery voltages were suppressed to 43V or less till the charging rate reached 7.00 C in Example 1 and till the charging rate reached 9.33 C in Example 2, and hydrogen did not generate in the 36V system control valve type lead-acid storage batteries (aqueous solution system secondary battery groups 2). Accordingly, the power systems of Example 1 and Example 2 could receive regenerative energy sufficiently.

At this time, as shown in Table 1 below, a ratio (X/Y) of a value (X) of current flowing through the aqueous solution system secondary battery group 1 and a value (Y) of current flowing through the non-aqueous solution system secondary battery group 2 was 0.05 to 1.00 in regeneration acceptance (charging) at a current value where the charging rate was 7.00 C or less in Example 1, and it was 0.10 to 1.00 at a current value where the charging rate was 7.00 C or less and it was 0.06 to 1.00 at a current value where the charging rate was 9.33 in Example 2.

TABLE 1

| CHARGING RATE | RATIO (X/Y) | |
| --- | --- | --- |
| (C) | Example 1 | Example 2 |
| 0.10 | 1.00 | 1.00 |
| 0.23 | 0.97 | 0.98 |
| 0.58 | 0.63 | 0.71 |
| 1.17 | 0.13 | 0.20 |
| 2.33 | 0.12 | 0.17 |
| 4.67 | 0.09 | 0.13 |
| 7.00 | 0.05 | 0.10 |
| 9.33 | 0.03 | 0.06 |

That is, in order to receive regenerative energy sufficiently without generating hydrogen in the aqueous solution system secondary battery group 2 as the power system where the aqueous solution system secondary battery group 2 and the non-aqueous solution system secondary battery group 1 are connected in parallel, it was found that the ratio (X/Y) of the value (X) of current flowing through the aqueous solution system secondary battery group 2 and the value (Y) of current flowing through the non-aqueous solution system secondary battery group 1 should be 0.05 or more at a regenerating (charging) time with a current value where the charging rate was 7.00 C or less. Further, when regeneration acceptance (charging) is performed at a very small current value where the charging rate is 0.10 C or less, the ratio (X/Y) becomes 1.00. In a case of such a small current, a difference in regenerative receiving capabilities could not be found between the aqueous solution system secondary battery group 2 and the non-aqueous solution system secondary battery group 1, which means that the same value of current flows through the both groups.

<Examples 3 to 6 and Comparative Example 2>

Charging tests were performed regarding Example 3 where the power system 20 was applied, Example 4 where one lithium ion secondary battery (3.6V–3.5 Ah) was used as the non-aqueous solution system secondary battery group 1 in the power system 30, Example 5 where the power system 40 was applied, and Example 6 where one lithium ion secondary battery (3.6V–3.5 Ah) was used as the non-aqueous solution system secondary battery group 1 in the power system 50. Charging test was performed regarding a Comparative example 2 of a conventional power system where only a 36V system control valve type lead-acid battery (36V–18 Ah) comprising 18 cells was used.

Figure 11:
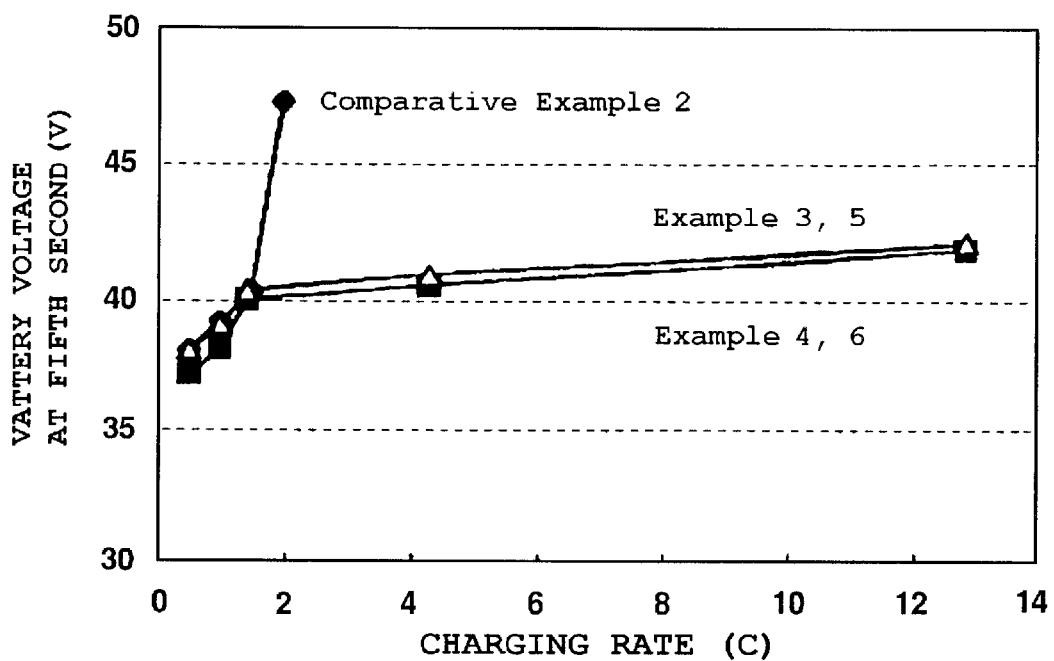
FIG. 11 is a graph showing a relationship between a battery voltage and a charging rate at a time of 5 seconds passed in power systems of Example 3 to 6 and Comparative Example 2.

FIG. 11 shows a relationship between fifth second battery voltages and charging rates based upon a 36V system control valve type lead-acid battery of Example 3 to Example 6 and Comparative example 2. In Example 3 to Example 6, since regenerative receiving capabilities of the lithium ion secondary battery were large, even when the charging rates exceeded 12 C, the fifth second battery voltages at discharge were suppressed to 42V or less, and hydrogen did not generate in the 36V system control valve type lead-acid battery. For this reason, regenerative energy could be accepted sufficiently as the rechargeable power systems. On the other hand, in Comparative example 2, when the charging rate exceeded 2 C, the battery voltage became 47V or more and hydrogen generated in the 36V system control valve type lead-acid battery so that it became impossible to perform charging. Also, it was found that energy efficiency could be improved as the power system by making the charging current to the lithium ion secondary battery larger than that to the 36V system control valve type lead-acid battery.

<Example 7 and Comparative Example 3>

In the power system 80, charging tests were performed regarding Example 7 where lithium ion secondary batteries (3.6V–3.4 Ah) connected in series by the number of 10 cells were used as the non-aqueous solution system secondary battery group 1 and Comparative example 3 where 9 lithium ion secondary batteries (3.6V–3.4 Ah) connected in series were used.

Figure 12:
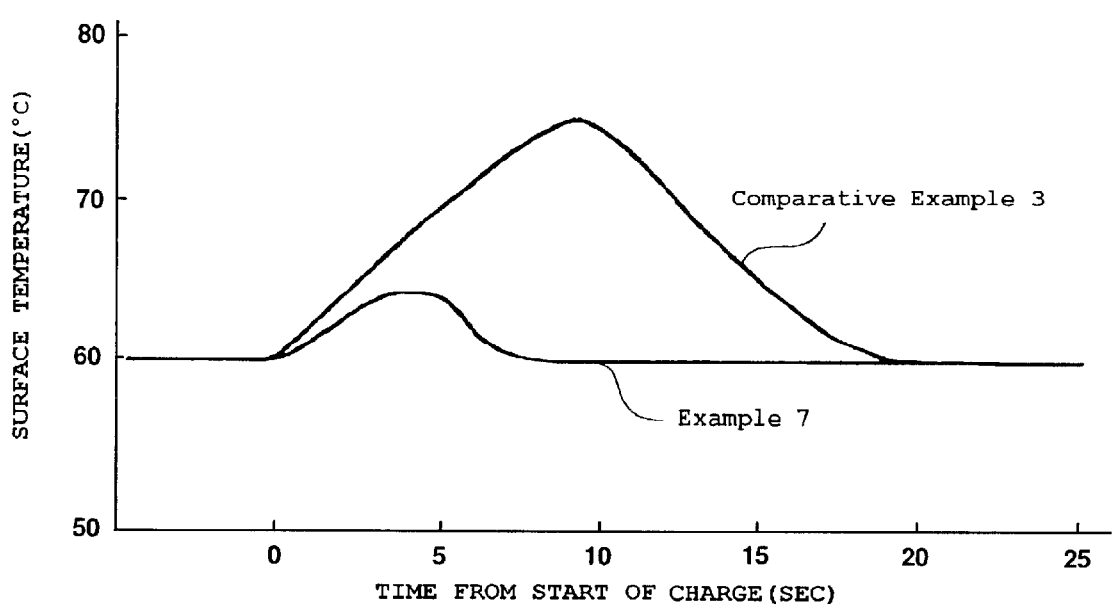
FIG. 12 is a graph showing a progress of a surface temperature of a lithium ion secondary battery at a time of charging of power systems of Example 7 and Comparative Example 3.
Figure 13:
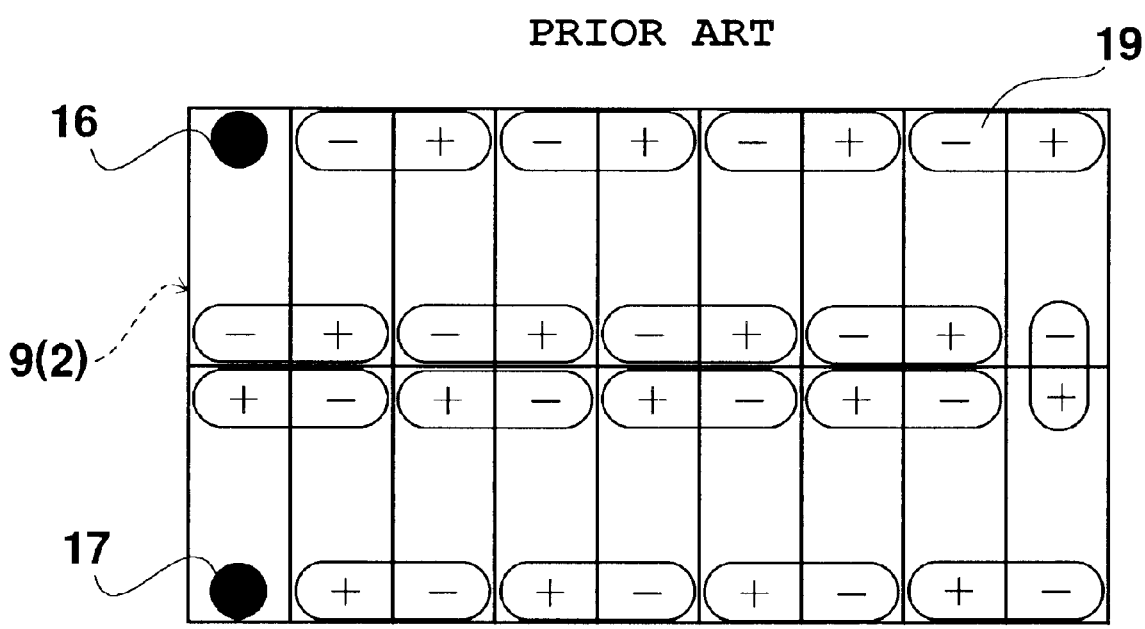
FIG. 13 is a plan view showing a cell array of an aqueous solution system secondary battery group used in a conventional power system.

The charging was performed for five seconds under an atmosphere of 60° C. (temperature level in an engine room of an automobile) and under 42V constant voltage control at a current value of 80 A. FIG. 12 shows a progress of a surface temperature of a lithium ion secondary battery at a time of charging of power systems of Example 7 and Comparative example 3.

The charging voltage of the lithium ion secondary battery in Example 7 was 4.2V/cell (42V/10 cells), and the surface temperature of the battery ascended up to 64° C. or so, but the surface temperature was cooled down to 60° C. when the charging was stopped after 5 seconds elapsed from a start of the charging. On the other hand, the charging voltage of the lithium ion secondary battery in Comparative example 3 was 4.7V/cell (42V/9 cells), and the surface temperature of the battery continued to ascend up to 75° C. or so even then the charging was stopped after 5 seconds. When the surface temperature reaches 80° C. or more, a possibility of thermal runaway becomes large, which means that the safety of the power system of Comparative example 3 is low.

It was also found that, even when a non-aqueous solution system secondary battery other than the lithium ion secondary battery was used as the non-aqueous solution system secondary battery group 1, a safe power system where there is no possibility of the thermal runaway could be provided by setting the charging voltage to 4.2V/cell or less.

What is claimed is:

1. A 42V power system which is mounted on a vehicle and which can receive electrical power supplied from a generator, comprising:
an aqueous solution system secondary battery group where a plurality of aqueous solution system cells are connected; and
a non-aqueous solution system secondary battery group which is connected to the aqueous solution system secondary battery group in parallel, which has a group battery capacity smaller than that of the aqueous solution system secondary battery group, and where a plurality of non-aqueous solution system cells are connected.

2. A 42V power system according to claim 1, wherein a ratio (X/Y) of a value (X) of current flowing through the aqueous solution system secondary battery group and a value (Y) of current flowing through the non-aqueous solution system secondary battery group is set to 0.05 or more and 1.00 or less during charging at a current value where charging rate is 7 C or less.

3. A 42V power system according to claim 1, wherein regeneration acceptance ability (A/l·kg) of the non-aqueous solution system secondary battery group is larger than that of the aqueous solution system secondary battery group.

4. A 42V power system according to claim 1, wherein a value of current charging the non-aqueous solution system secondary battery group is larger than that of current charging the aqueous solution system secondary battery group.

5. A 42V power system according to claim 1, wherein charging voltage of the non-aqueous solution system secondary battery group is set to 4.2V/cell or less.

6. A 42V power system according to claim 1, further comprising a battery controller which controls at least a state of charge of the non-aqueous solution system secondary battery group.

7. A 42V power system according to claim 6, wherein the battery controller controls a state of charge of the aqueous solution system secondary battery group on the basis of the state of charge of the non-aqueous solution system secondary battery group.

8. A 42V power system according to claim 7, wherein the battery controller controls the state of charge of the aqueous solution system secondary battery group on the basis of a relationship between the state of charge and a battery voltage of the non-aqueous solution system secondary battery group.

9. A 42V power system according to claim 6, wherein the battery controller controls respective states of charge of the aqueous solution system secondary battery group and the non-aqueous solution system secondary battery group independently.

10. A 42V power system according to claim 1, wherein a charging path for charging the non-aqueous solution system secondary battery group is different from a charging path for charging the aqueous solution system secondary battery group.

11. A 42V power system according to claim 10, further comprising a flow divider which divides current so as to maintain the states of charge of the aqueous solution system secondary battery group and the non-aqueous solution system secondary battery group in the same level, wherein a charging/discharging circuit of the aqueous solution system secondary battery group and a charging/discharging circuit of the non-aqueous solution system secondary battery group are connected to each other through the flow divider.

12. A 42V power system according to claim 11, wherein the flow divider divides current on the basis of a group battery capacity ratio of the aqueous solution system secondary battery group and the non-aqueous solution system secondary battery group.

13. A 42V power system according to claim 6, further comprising a DC/DC converter which causes the voltage of the non-aqueous solution system secondary battery group to coincide with the battery voltage of the aqueous solution system secondary battery group.

14. A 42V power system according to claim 1, wherein one of the aqueous solution system secondary battery group and the non-aqueous solution system secondary battery group has a discharging path reaching a vehicle starter.

15. A 42V power system according to claim 1, wherein the aqueous solution system cell is a lead-acid battery.

16. A 42V power system according to claim 15, wherein the lead-acid battery is a 36V system control valve type lead-acid battery.

17. A 42V power system according to claim 1, wherein the non-aqueous solution system cell is a lithium secondary battery.

18. A 42V power system according to claim 17, wherein the lithium secondary battery is a 36V system lithium ion secondary battery.

19. A 42V power system according to claim 1, wherein the aqueous solution system secondary battery group is structured by 18 lead-acid batteries connected in series, and the non-aqueous solution system secondary battery group is structured by 10 to 11 lithium secondary batteries connected in series.

20. A 42V power system according to claim 1, wherein the aqueous solution system secondary battery group and the non-aqueous solution system secondary battery group are accommodated in a mono-block container having 20 cell chambers partitioned in an array of two rows and ten columns; the non-aqueous solution system cells of the non-aqueous solution system secondary battery group connected by the number of 18 in series are accommodated in a cell chamber of the first row and the first column and/or a cell chamber of the first row and the tenth column of the mono-block container; the aqueous solution system cells of the aqueous solution system secondary battery group are accommodated in 18 cell chambers of respective cell chambers defined at the first row and the second to ninth columns and respective cell chambers defined at the second row and all the columns of the mono-block container; the 18 aqueous solution system cells are connected in series by connecting members for connecting adjacent cell chambers in the order of the second row and the first column, the second row and the second column, the first row and the second column, the first row and the third column, the second row and the third column, the second row and the fourth column, the first row and the fourth column, the first row and the fifth column, the second row and the fifth column, the second row and the sixth column, the first row and the sixth column, the first row and the seventh column, the second row and the seventh column, the second row and the eighth column, the first row and the eighth column, the first row and the ninth column, the second row and the ninth column, and the second row and the tenth column; and the cell chamber defined at the second row and the first column and the cell chamber defined at the second row and the tenth column are provided with external output terminals.

21. A state of charge estimating method for estimating a state of charge of the 42V power system according to claim 11, wherein the state of charge of the aqueous solution system secondary battery group is estimated by detecting the state of charge of the non-aqueous solution system secondary battery group.

22. A state of charge estimating method according to claim 21, wherein the state of charge of the aqueous solution system secondary battery group is estimated by detecting respective initial states of charge of the aqueous solution system secondary battery group and the non-aqueous solution system secondary battery group and the change rate of the state of charge of the non-aqueous solution system secondary battery group.

* * * * *

UNITED STATES PATENT AND TRADEMARK OFFICE
CERTIFICATE OF CORRECTION

PATENT NO. : 6,366,055 B1
DATED : April 2, 2002
INVENTOR(S) : Tetsuro Ookoshi, Satoshi Minoura, Tokiyoshi Hirasawa, Yoshinari Morimoto, Ichiro Shimoura, Yoshihisa Okuda, Kenichi Maeda and Keizo Yamada It is certified that error appears in the above-identified patent and that said Letters Patent is hereby corrected as shown below:

<u>Title page,</u>
Item [75], Inventors, please change "Kenichi Maeda; Saitama;" to
-- Kenichi Maeda; Osato-gun --

Signed and Sealed this

Twenty-fourth Day of September, 2002

Attest:

Attesting Officer

JAMES E. ROGAN
*Director of the United States Patent and Trademark Office*